(12) United States Patent
Bruls et al.

(10) Patent No.: US 9,967,537 B2
(45) Date of Patent: May 8, 2018

(54) SYSTEM FOR GENERATING INTERMEDIATE VIEW IMAGES

(71) Applicant: KONINKLIJKE PHILIPS N.V., Eindhoven (NL)

(72) Inventors: Wilhelmus Hendrikus Alfonsus Bruls, Eindhoven (NL); Meindert Onno Wildeboer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 299 days.

(21) Appl. No.: 14/763,894

(22) PCT Filed: Nov. 13, 2013

(86) PCT No.: PCT/EP2013/073733
§ 371 (c)(1),
(2) Date: Jul. 28, 2015

(87) PCT Pub. No.: WO2014/121860
PCT Pub. Date: Aug. 14, 2014

(65) Prior Publication Data
US 2015/0365646 A1     Dec. 17, 2015

(30) Foreign Application Priority Data
Feb. 6, 2013 (EP) .................................... 13154244

(51) Int. Cl.
*H04N 13/00* (2006.01)
(52) U.S. Cl.
CPC ....... *H04N 13/0011* (2013.01); *H04N 13/004* (2013.01)
(58) Field of Classification Search
CPC .......................... H04N 13/0011; H04N 13/004
(Continued)

(56) References Cited

U.S. PATENT DOCUMENTS 5,530,774 A * 6/1996 Fogel ....................... G06K 9/20
                                                                                   348/50
5,929,859 A    7/1999 Meijers
(Continued)

FOREIGN PATENT DOCUMENTS

EP        0678832 A2    10/1995
EP        2150065 A2     2/2010
(Continued)

OTHER PUBLICATIONS

Smeaton, Alan F. et al "Video Shot Boundary Detection: Seven Years of TRECVid Activity" Computer Vision and Image Understanding, vol. 114, 2010, pp. 411-418.
(Continued)

*Primary Examiner* — Deirdre Beasley

(57) ABSTRACT

An intermediate image (161) is generated from stereo data (105) comprising a left image (101), a left disparity data (111), a right image (102) and a right disparity data (112). The intermediate image (161) corresponds to an intermediate view (155). A mixing policy (156) is determined based on a predicted image quality of the intermediate image (161). When the determined mixing policy (156) so requires, a left intermediate image (131) is generated from the left data (103) for the intermediate view (155). When the determining mixing policy (156) so requires, a right intermediate image (141) is generated from the right data (104) for the intermediate view (155). The intermediate image (161) is generated by mixing (180) the left intermediate image (131) and the right intermediate image (141), according to the mixing policy (156).

19 Claims, 7 Drawing Sheets

(58) Field of Classification Search
USPC .......................................................... 348/43
See application file for complete search history.

(56) References Cited

U.S. PATENT DOCUMENTS

| | | | |
|---|---|---|---|
| 6,064,424 A | 5/2000 | Van Berkel | |
| 6,327,381 B1 | 12/2001 | Rogina | |
| 6,625,304 B1 | 9/2003 | Bruijns | |
| 6,985,604 B2 | 1/2006 | Braspenning | |
| 7,689,031 B2 | 3/2010 | Berretty | |
| 9,445,072 B2* | 9/2016 | Stefanoski | G06T 5/50 |
| 2008/0049100 A1* | 2/2008 | Lipton | H04N 13/0011 |
| | | | 348/43 |
| 2010/0142824 A1 | 6/2010 | Lu | |
| 2010/0194858 A1* | 8/2010 | Lim, II | H04N 13/0011 |
| | | | 348/46 |
| 2010/0289877 A1* | 11/2010 | Lanfranchi | G02B 27/2207 |
| | | | 348/46 |
| 2011/0026809 A1* | 2/2011 | Jeong | H04N 13/0011 |
| | | | 382/154 |
| 2011/0157159 A1 | 6/2011 | Chen | |
| 2011/0261050 A1* | 10/2011 | Smolic | G06T 15/20 |
| | | | 345/419 |
| 2011/0268009 A1 | 11/2011 | Yamada | |
| 2011/0304708 A1 | 12/2011 | Konstantinovich | |
| 2011/0316985 A1* | 12/2011 | Ishikawa | G02B 27/2214 |
| | | | 348/51 |
| 2012/0169722 A1* | 7/2012 | Hwang | H04N 13/0011 |
| | | | 345/419 |
| 2012/0268561 A1 | 10/2012 | Seki | |
| 2013/0249904 A1* | 9/2013 | Kobayashi | H04N 13/0014 |
| | | | 345/419 |

FOREIGN PATENT DOCUMENTS

| | | |
|---|---|---|
| EP | 2348733 A2 | 7/2011 |
| EP | 2393298 A1 | 12/2011 |
| WO | 2009125988 A2 | 10/2009 |
| WO | 2012007867 A1 | 1/2012 |
| WO | 2012042998 A1 | 4/2012 |

OTHER PUBLICATIONS

Blu-Ray Disc White Paper, 2.B Audio Visual Application Format Specifications for BD-ROM Version 2.5, Jul. 2011.

* cited by examiner

SYSTEM FOR GENERATING INTERMEDIATE VIEW IMAGES

CROSS-REFERENCE TO PRIOR APPLICATIONS

This application is the U.S. National Phase application under 35 U.S.C. § 371 of International Application No. PCT/EP2013/073733, filed on Nov. 13, 2013, which claims the benefit of European Patent Application No. 13154244.1, filed on Feb. 6, 2013. These applications are hereby incorporated by reference herein.

FIELD OF THE INVENTION

The invention relates to generating an intermediate image from stereo data.

Stereo image is a common representation for three-dimensional (3D) image data. A stereo image comprises a left image corresponding to a left view and a right image corresponding to a right view. Using a stereo display means for viewing the stereo image, a viewer's left eye sees the left image and the viewer's right eye sees the right image, causing a 3D perception in the viewer.

For viewing a 3D image at an intermediate view, being different from the left view and the right view of the stereo image, an intermediate image needs to be generated. Various methods exist for generating an intermediate image from a stereo image.

BACKGROUND OF THE INVENTION

US2011/00268009 A1 describes a method to compute an intermediate image at an intermediate view from a stereo image for viewing on a multiview display. The intermediate view refers to a view at relative position in the range of views comprising the left view and the right view. The method computes left disparity data and right disparity data from the stereo image, the stereo image comprising a left image and a right data. The method generates a left intermediate image for the intermediate view, using the left image and the left disparity data. The method generates a right intermediate image for the intermediate view, using the right image and the right disparity data. The final intermediate image is then generated by blending the left intermediate image and the right intermediate image.

A drawback of the prior art method is that it also generates visible image artifacts in the intermediate image, the most notable image artifacts being image detail blur and occlusion artifacts. Visibility of the artifacts varies with intermediate view and with content of the stereo image. Detail blur is typically most visible for a stereo image containing much detail and at views in between the left view and the right view. A cause of detail blur lies in imperfect mixing of the generated left intermediate image and the right intermediate image. Occlusion artifacts are most visible for a stereo image containing large depth transitions, most notably at lateral views, thus at the left of the left view and at the right of the right view. A cause of occlusion artifacts lies in imperfect extrapolation of the left image or of the right image.

In the prior art method, image quality is suboptimal as the intermediate image suffers from image artifacts that vary with the intermediate view and with the content of stereo image. Improvement of the image quality of the intermediate image is desired.

SUMMARY OF THE INVENTION

It is an object of the invention to provide a method for generating an intermediate image from stereo data, wherein the intermediate image has improved image quality.

The invention discloses a method for generating an intermediate image from stereo data for an intermediate view. The method uses a mixing of a left intermediate image and a right intermediate image according to a mixing policy. The mixing policy defines relative contributions of the left and right intermediate image in the mixing as a function of the intermediate view. The stereo data comprises a left data and a right data. The left data corresponds to a left view and the left data comprising a left image and a left disparity data. The right data corresponds to a right view and the right data comprising a right image and a right disparity data. The intermediate image corresponds to an intermediate view. The left intermediate image is generated from the left data for the intermediate view. The right intermediate image is generated from the right data for the intermediate view. The method comprises: predicting the image quality of the intermediate image for each of a plurality of mixing policies based on an image characteristic of the stereo data; determining the mixing policy by selecting a mixing policy from the plurality of mixing policies based on a predicted image quality of the intermediate image; and, when the determined mixing policy so requires, generating the left intermediate image from the left data for the intermediate view; and, when the determining mixing policy so requires, generating a right intermediate image from the right data for the intermediate view; and generating the intermediate image by mixing the left intermediate image and the right intermediate image using the relative contributions according to the determined mixing policy.

In this manner the present invention provides flexibility, allowing the intermediate image to be generated purely based on the left intermediate image, purely based on the right intermediate image, but also, i.e. when the mixing policy so indicates, as claimed based on both the left intermediate image and the right intermediate image.

Input for the method is stereo data comprising a left data and a right data. The left data corresponds to a left view and the right data corresponds to a right view. The left view and the right view define two points of view from where a 3D image is viewed by a viewer. The left data comprises a left image and a left disparity data. The right data comprises a right image and a right disparity data. Output of the method is an intermediate image for an intermediate view different than the left view and the right view.

The intermediate image is generated by a mixing of a left intermediate view and a right intermediate view, according to a mixing policy. The mixing policy process defines how the mixing depends on the intermediate view. In a general case, the mixing policy defines a left relative contribution of the left intermediate image in the mixing, and defines a right relative contribution of the right intermediate image in the mixing. The intermediate image is then generated by mixing the left intermediate image and the right intermediate image using weights according to said relative contributions. In a first special case, wherein the mixing policy requires only generating the left intermediate image, the mixing effectively copies the left intermediate image to the intermediate image. In a second special case, wherein the mixing policy requires only generating the right intermediate image, the mixing effectively copies the right intermediate image to the intermediate image.

The left intermediate image is generated using the left disparity, a warping process 'warps' the left image to the intermediate view using the left disparity data, but only when the mixing policy so requires. Using the right disparity process, a warping process warps the right image to the intermediate view using the right disparity data, but only when the mixing policy so requires.

The mixing is not fixed but is controlled by the mixing policy that is determined by a policy determining process. The mixing policy is determined such that the image quality of the intermediate data is optimal, either based on human perception or using a (set of) quality metric(s). To that end, the policy determining process determines the mixing policy based on the predicted image quality of the intermediate image that would be generated using the mixing policy.

Optionally, the determining is based on a predicted image quality depending on the amount of image detail of the intermediate image. If the amount of image detail is large, the mixing will generate artifacts, such as blurring and ghosting, if a mixing policy were used that defines a mixing using both the left intermediate image and the right intermediate image. Having detected a large amount of image detail a mixing policy is determined such that the generated image detail in the intermediate image has an improved image quality, either based on human perception or using a (set of) quality metric(s).

Optionally, the determining is performed by retrieving the mixing policy from meta-data coupled to the stereo data. The policy determining process determines the mixing policy off-line and stores it in meta-data coupled to the stereo data. This way of working allows the use of more complex, and costly hardware for analysis. It moreover allows the generation of the meta-data to be integrated in the authoring tools at the disposal of the content author.

Optionally, the generating the intermediate image comprises generating subsequent intermediate images from respective subsequent frames of a stereo view video sequence, each of the respective subsequent frames comprising stereo data. An intermediate image thus is generated from a stereo view video frame.

Optionally, the determining comprises determining a first mixing policy for generating a first intermediate image from a first frame at a first instance and determining a second mixing policy for generating a second intermediate image from a second frame at a second instance. The intermediate images generated from the first frame have an optimal image quality (according to a (set of) metric(s) and/or human perception) when the first mixing policy is used in the mixing. Furthermore, intermediate images generated from the second frame have an optimal image quality when the second mixing policy is used in the mixing. Intermediate images are thus generated from different stereo view video frames using respective different mixing policies Optionally, the determining comprises determining a third mixing policy for generating a third intermediate image from a third frame at a third instance, wherein the third instance occurs after the first instance and before the second instance, and a third mixing factor defined by the third mixing policy lies in between a first mixing factor defined by the first mixing policy and a second mixing factor defined by the second mixing policy. The mixing policy thus changes gradually with time, in the sense that the instances are ordered in time as first, third, second, and the mixing factors are ordered also as first, third, and second.

Optionally, generating the intermediate image comprises generating a series of intermediate images from the stereo data, the series corresponding to a series of intermediate views, the series of intermediate views being spatially consecutive views. Thus, rather than generating one intermediate image from the stereo data for one view, a series of intermediate images is generated from the stereo data for a series of respective views, for example for a multi-view display.

Optionally, the generating a first series of intermediate images comprises centering the series of intermediate views at a first central intermediate view, selecting the central intermediate view based on a predicted image quality of the series of intermediate images for the first central intermediate view. Centering the series of intermediate views at the central intermediate view means changing the series of intermediate views to the left or right so that said central intermediate view is now directly in front of the viewer. Notably if the number of views in the series is odd centering corresponds to placing the center view of the series at the first central intermediate view, i.e. directly in front of the viewer. In the event that there is an even number of views in the series, centering implies that the two center views will be centered equidistant around the first central intermediate view. Using a mixing policy, the image quality of intermediate images can be (overall in the range of views) improved for views near the central intermediate view. The series of views is therefore centered at the central intermediate view.

Optionally, the generating the intermediate image comprises generating a first series of intermediate views from a first frame at a first instance centered at a first central intermediate view, and generating a second series of intermediate views from a second frame at a second instance centered at a second central intermediate view. Using a (same) mixing policy for the first frame and the second frame, image quality of intermediate images generated from the first frame can be improved for views near the first intermediate view, but image quality of intermediate images of the second frame can be improved for views near the second intermediate view. The series of views is therefore centered at the first view for the first frame, and at the second view for the second frame. The resulting image quality near the first central intermediate view of the first series of intermediate view is therefore optimal for the first frame as well as for the second frame.

Optionally, the generating the intermediate image comprises generating a third series of intermediate views from a third frame at a third instance centered at a third central intermediate view, and wherein the third instance occurs after the first instance and before the second instance, and wherein the third view lies in between the first view and the second view. The central intermediate view where the series of intermediate views is centered, shifts gradually from the first view at the first frame, to a next view at a next frame (i.e. the third view at the third frame), to the second view at the second frame. The shift of the series of intermediate views is performed gradually over time, in the sense that the instances are ordered in time as first, third, second, and the central views are ordered in space also as first, third, and second.

Optionally, the mixing policy defines, for a range of intermediate views, a left relative contribution of the left intermediate image in the mixing and defines a right relative contribution of the right intermediate image in the mixing, one of the left relative contribution and the right relative contribution dominating, across the range, the other of the left relative contribution and the right relative contribution. The mixing policy defines a mixing wherein one of the left- and the right relative contribution is overall larger in the range of intermediate views. Such a mixing policy is also called an asymmetric mixing policy.

Optionally, generating the intermediate image comprises generating the intermediate image for still stereo data as opposed to a stereo data video sequence.

Optionally, the left disparity data is computed from the left image and the right image, and the right disparity data is computed from the left image and the right image. The disparity data is not provided with the stereo data, but is computed from the left image and the right image.

The invention discloses a system arranged for generating an intermediate image from stereo data for an intermediate view, using a mixing of a left intermediate image and a right intermediate image according to a mixing policy. The mixing policy defines relative contributions of the left and right intermediate image in the mixing as a function of the intermediate view. The stereo data comprises a left data and a right data, wherein the left data corresponds to a left view and the left data comprising a left image and a left disparity data, and the right data corresponds to a right view and the right data comprising a right image and a right disparity data. The intermediate image corresponds to an intermediate view. The left intermediate image is generated from the left data for the intermediate view. The right intermediate image is generated from the right data for the intermediate view. The system comprising a generating unit arranged for executing: a predicting function for predicting the image quality of the intermediate image for each of a plurality of mixing policies based on an image characteristic of the stereo data; and a mixing policy function for determining the mixing policy by selecting a mixing policy from the plurality of mixing policies based on a predicted image quality of the intermediate image; and a left warping function for, when the determined mixing policy so requires, generating a left intermediate image from the left data for the intermediate view; and a right warping function for, when the determining mixing policy so requires, generating a right intermediate image from the right data for the intermediate view; and a mixing function for generating the intermediate image by mixing the left intermediate image and the right intermediate image, using the relative contributions according to the determined mixing policy. The system comprises functions that perform the processes the method described above.

Optionally, the intermediate image is used in driving a multi-view display. The multi-view display outputting multiple views in multiple directions, thereby allowing a viewer, when properly positioned relative to the multi-view display, to see a left image with her left eye and a right image with her right eye.

The effect of the invention is that image quality of the intermediate image data can be improved because the mixing policy is made dependent on the image content.

BRIEF DESCRIPTION OF THE DRAWINGS

These and other aspects of the invention are apparent from and will be elucidated with reference to the embodiments described hereinafter.

In the drawings.

It should be noted that items which have the same reference numbers in different figures, have the same structural features and the same functions, or are the same signals. Where the function and/or structure of such an item has been explained, there is no necessity for repeated explanation thereof in the detailed description

DETAILED DESCRIPTION OF EMBODIMENTS

Figure 1A:
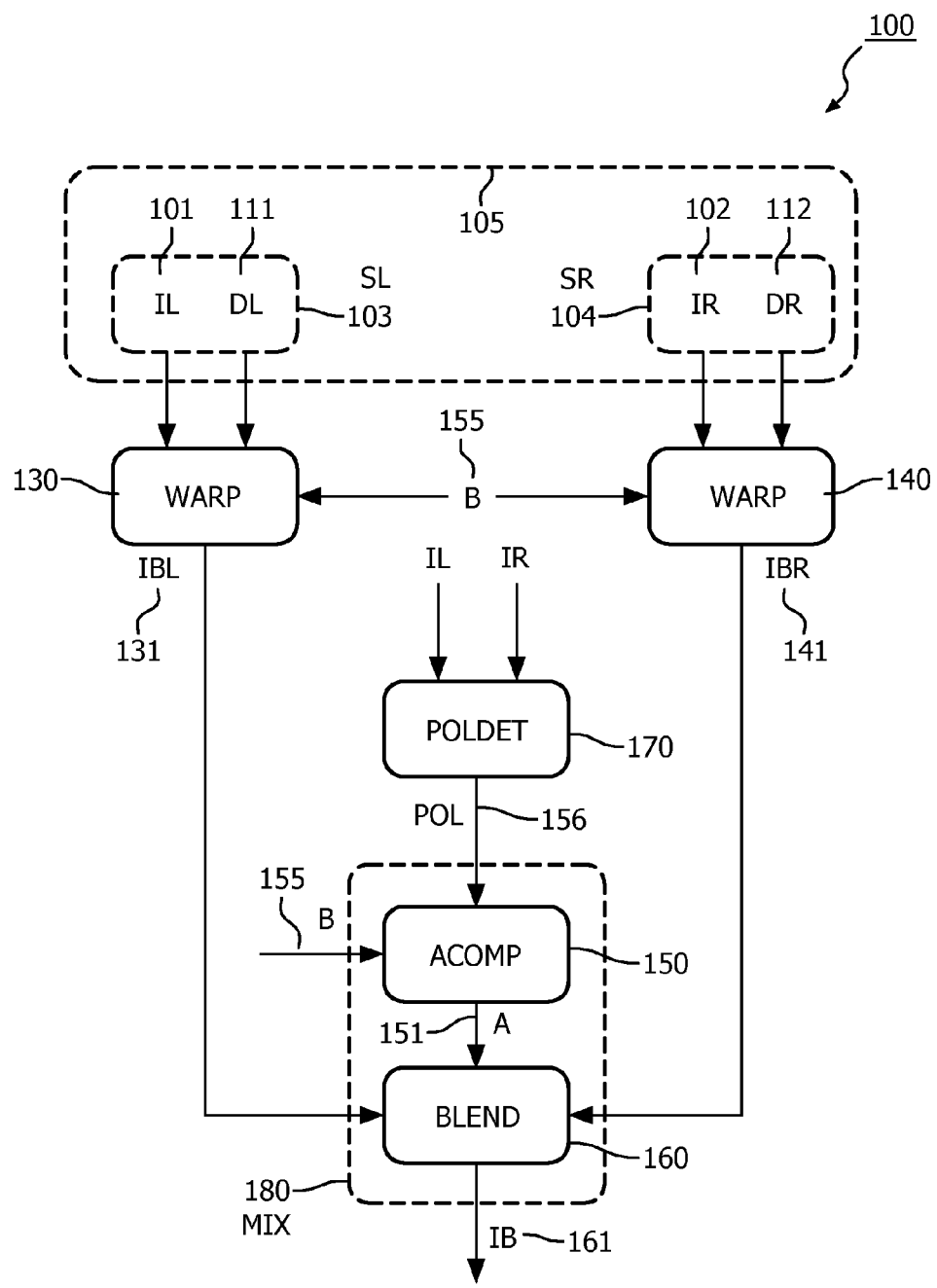
FIG. 1a illustrates a method for generating an intermediate image from stereo data.

FIG. 1a illustrates a method for generating an intermediate image from stereo data. 105. Output of the method is an intermediate image IB 161 corresponding to an intermediate view B 155. The intermediate view B 155 refers to a view at relative position in the range of views, wherein the range typically comprises the left view and the right view, and at least comprises one of the left view and the right view. Input of the method is stereo data comprising a left data SL 103 and a right data SR 104. The left data SL comprises a left image IL 101 and left disparity DL data 111. The right data SR comprises a right image IR 102 and right disparity data DR 112.

As will be clear to those skilled in the art, depth is inversely proportional to disparity, however the actual mapping of depth to disparity in display devices is subject to various design choices such as, the total amount of disparity that may be generated by the display, the choice of allocating a particular depth value to zero disparity, the amount of crossed disparity allowed, etc. However, the depth data which is provided with the stereo data and/or which is derived from the input stereo data, is used to warp images in a depth dependent manner. Therefore disparity data is here qualitatively interpreted as depth data.

A warping process WARP 130 generates a left intermediate image IBL 131 from three inputs: (i) the left image IL, (ii) the left disparity data DL, and (iii) an intermediate view B 155. The left warping process WARP 130 effectively generates the left intermediate image IBL, using the left disparity data DL to 'warp' the left image IL to the intermediate view B. Likewise, a warping process WARP 140 generates a right intermediate image IBR 141 from the right image IR, the right disparity data DR, and the intermediate view B. An example of such a warping process that uses depth/disparity for image-based rendering is disclosed in U.S. Pat. No. 5,929,859. A more complex example of warping is presented in U.S. Pat. No. 7,689,031.

A mixing process MIX 180 performs a mixing of the left intermediate image IBL and the right intermediate image IBR. The mixing depends on the intermediate view B, and on a mixing policy POL 156 that describes how the mixing depends on the intermediate view B. Output of the mixing process MIX is the intermediate image IB 161. A policy determining process POLDET 170 determines the mixing policy POL based on the stereo image, i.e. based on the left image IL and the right image IR.

Optionally, the method comprises a disparity computing process that computes the left disparity data DL and the right disparity data DL from the left image IL and the right image IR. Examples of depth/disparity estimation algorithms are known to those skilled in the art of 3D video processing, examples of such algorithms are provided in U.S. Pat. No. 6,625,304 and U.S. Pat. No. 6,985,604. Optionally, the warping processes WARP 130 and WARP 140 generates an intermediate image using pre-computed disparity data obtained from a stereo view video sequence, wherein each stereo view video frame comprises a stereo image as well as corresponding disparity data.

The mixing process MIX is composed of a factor computing process ACOMP 150 and of a blending process BLEND 160 as depicted in FIG. 1a. The factor computing process ACOMP 150 computes a mixing factor A from the intermediate view B and the mixing policy POL, wherein the mixing policy POL describes how the mixing factor A depends on the intermediate view B. The factor computing process ACOMP computes a mixing factor A from the intermediate view B according to the mixing policy POL. The blending process BLEND then generates the intermediate image IB by mixing the intermediate images IBL and IBR, using the mixing factor A. Optionally, the blending process BLEND comprises a technique commonly known as 'alpha blending', which is further described below.

The mixing policy POL describes how the mixing of the intermediate images IBL and IBR depends on the intermediate view B. The policy determining process POLDET determines a mixing policy POL such that the mixing process MIX generates an intermediate image IB with optimal image quality. Processing POLDET predicts the impact of a mixing policy on the image quality of the intermediate image IB, using knowledge about the impact of a mixing policy on the image quality of the intermediate image generated by the mixing. In other words, the policy determining processing POLDET predicts the image quality of the intermediate image for each of several mixing policies and for a given stereo image content, and then determines from the several mixing policies which mixing policy POL will generate an intermediate image with optimal image quality.

Optionally, the mixing policy process POLDET determines a mixing policy POL from meta-data comprising the mixing policy, wherein the meta-data is comprised by the stereo data. For example, the meta-data is produced off-line by an algorithm that (1) generates intermediate images from the stereo data using the method of FIG. 1 using various mixing policies, (2) measures the image quality of the generated intermediate images, (3) determines the generated intermediate image having the optimal image quality, and (4) determines the mixing policy corresponding to the generated intermediate image having the optimal image quality.

Figure 1B:
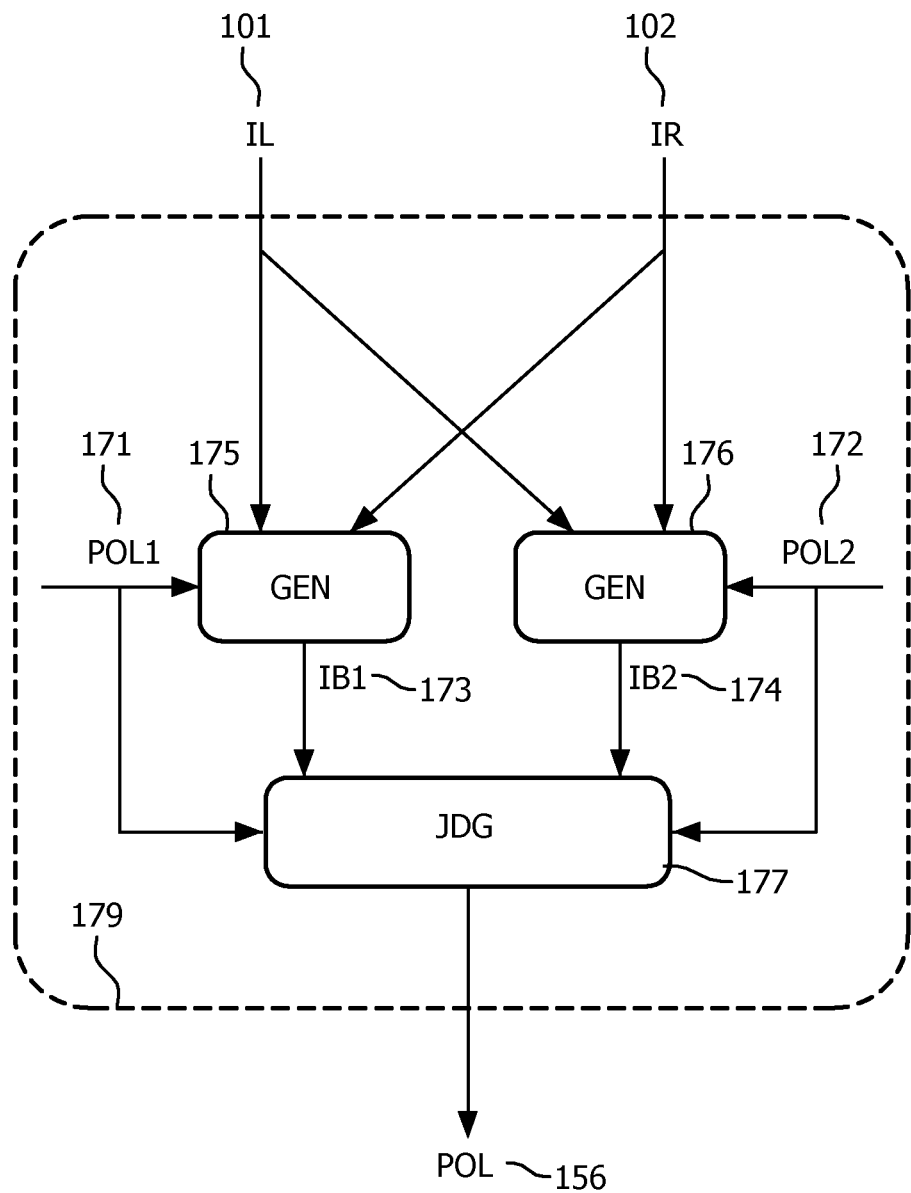
FIG. 1b illustrates a policy determining process determining a mixing policy in an off-line manner.

FIG. 1b illustrates a policy determining process determining a mixing policy in an off-line manner. The mixing policy determining process 179 receives the stereo image as input, i.e. the left image IL 101 and the right image IR 102. A first intermediate image IB1 173 is generated by a generating method GEN 175 using a first mixing policy POL1 171 and the stereo image. Likewise, a second intermediate image IB2 174 is generated by a generating method GEN 176 using a second mixing policy POL2 172 and the stereo image. The generating methods GEN 175, 176 employ the method of FIG. 1a for generating an intermediate image, using the respective mixing policies POL1,POL2. The generating methods GEN 175, 176 select an intermediate view to generate an intermediate image to be used for measuring its image quality. In a judging process JDG 177, one or more viewers judge the image quality of the intermediate images IB1,IB2, and select one of the intermediate images IB1,IB2 having an image quality that is judged as optimal. The mixing policy corresponding to the intermediate image having optimal image quality is then determined as the mixing policy POL 156. For example, if the intermediate image IB1 is judged to have an optimal image quality in comparison to the second intermediate image IB2, then the mixing policy POL is determined as the second mixing policy POL2, thus POL=POL2.

Optionally, the judging process JDG is not performed by viewers but instead performed automatically by an algorithm that quantifies and judges the image quality of the intermediate images IB1 and IB2.

Optionally, the policy determining process 179 of FIG. 1b determines the mixing policy 156 based on the image quality of multiple intermediate images for each of the policies POL1 and POL2. The generating processes GEN 175,176 each generate multiple intermediate images IB1 and IB2 for a respective multiple views. The judging process JDG then judges an average image quality of the multiple intermediate images IB1, and judges an average image quality of the multiple intermediate images IB1, and selects the multiple intermediate images having an average image quality that is judged as optimal. The mixing policy corresponding to the intermediate image having optimal average image quality is then determined as the mixing policy POL 156.

Alternatively, the policy determining process POLDET comprises a detection of the presence of image detail in the stereo image, and uses the detected presence in the determining of a mixing policy. When using some mixing policies, the image quality of image details in the generated intermediate image is higher than when using other mixing policies. Inaccuracies in the disparity data DL,DR lead to inaccurately generated image details in the respective intermediate images IBL,IBLR. Mixing of the inaccurately generated image details from the intermediate images IBL, IBR therefore leads to artifacts in the intermediate image IB that result from the mixing. The artifacts comprise detail blur, i.e. loss of detail sharpness, and/or ghosting, i.e. double appearance of image details. These artifacts appear less when mixing is performed according to a mixing policy that defines a mixing using predominantly one of the intermediate images. However, using predominantly one of the intermediate images in turn leads to occlusion artifacts. Therefore, the mixing policy that defines a mixing using predominantly one of the intermediate images is only determined if the stereo image comprises sufficient image detail, such that occlusion artifacts affect the image quality less than detail blur artifacts.

Figure 1C:
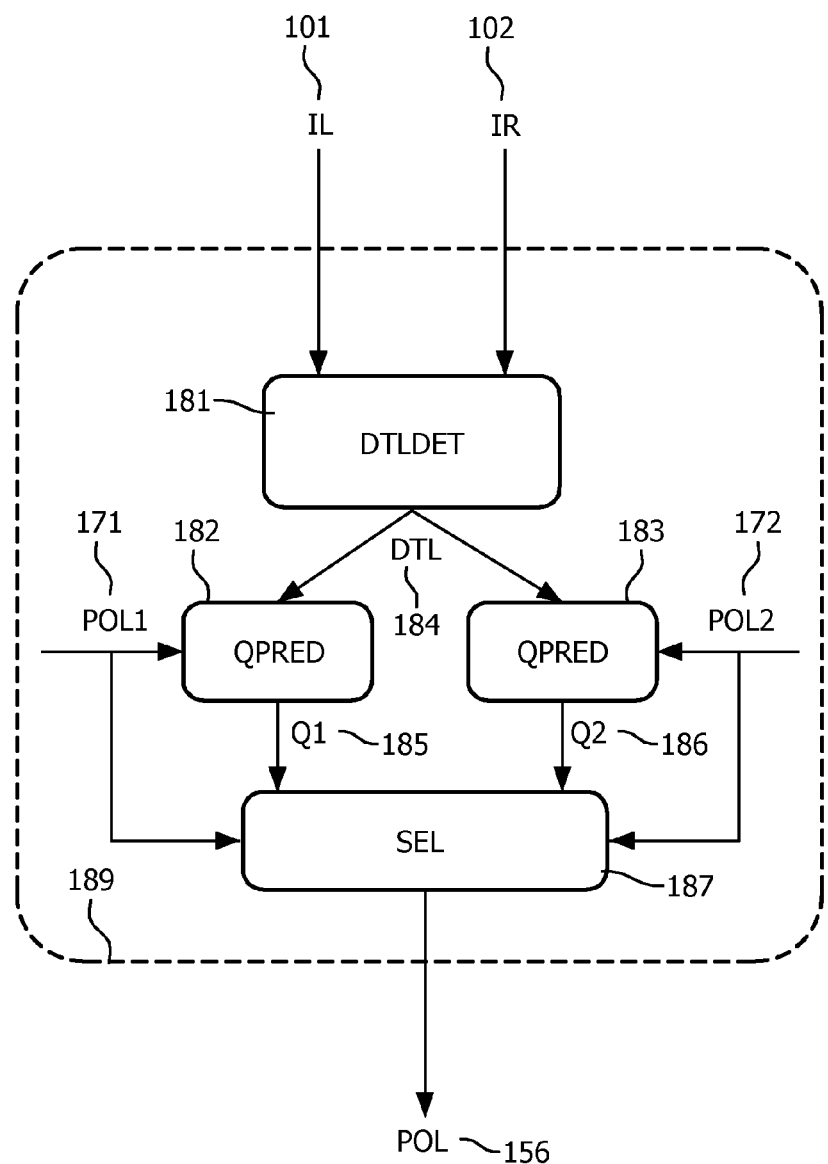
FIG. 1c illustrates a policy determining process that uses a detection of image detail.

FIG. 1c illustrates a policy determining process that uses a detection of image detail. The policy determining process 189 illustrates how the mixing policy POL 156 is determined based on a detected presence of image detail in the stereo data. The mixing policy determining process 189 receives the stereo image as input, i.e. the left image IL 101 and the right image IR 102. A process DTLDET 181 comprises a detail detection algorithm that detects image detail DTL 184 in the stereo image. A quality predicting process QPRED 182 receives the detected image detail DTL and a first mixing policy POL1 171, and determines the predicted image quality Q1 185 of an intermediate image that would be generated using the first mixing policy POL1. A quality predicting process QPRED 183 receives the detected image detail DTL and a second mixing policy POL2 172, and determines the predicted image quality Q2 186 of an intermediate image that would be generated using the second mixing policy POL2. The quality predicting processes QPRED 182,183 predict image quality using statistical knowledge about the impact of the mixing policies POL1, POL2 on the image quality of intermediate images generated using the mixing policies POL1, POL2. A process SEL 187 determines one of the predicted image qualities Q1, Q2 as being optimal, and determines the mixing policy corresponding to the optimal predicted image quality as the mixing policy POL 156. For example, if the predicted image quality Q2 is optimal compared to the predicted image quality Q1, then the mixing policy POL is determined as the second mixing policy POL2, thus POL=POL2. The predicted image qualities Q1 and Q2 may each be represented by a single value, whereas the highest of the two predicted image qualities Q1,Q2 is determined as being optimal.

Optionally, the detail detection algorithm uses only one of the left image and the right image of the stereo image.

Optionally, the determining of the predicted of image quality is based on occlusion artifacts. For example, in an analogous manner to using a detail detection algorithm, the process determining process uses a disparity transition detection algorithm that receives at least one of the disparity data DL, DR and that detects large transitions in disparity. Using statistical knowledge about the impact of the disparity transitions on the image quality of intermediate images generated with various mixing policies, the policy determining process determines a mixing policy. Note that this example implies that the policy determining process receives at least one of the disparity data DL, DR.

Optionally, the determining mixing processes 179,189 of the figures FIGS. 1b and 1c determine the mixing policy from a plurality of mixing policies, wherein the plurality of mixing policies comprises more mixing policies than two mixing policies POL1,POL2. For example, the plurality comprises three additional mixing policies POL3, POL4 and POL5.

Figure 2:
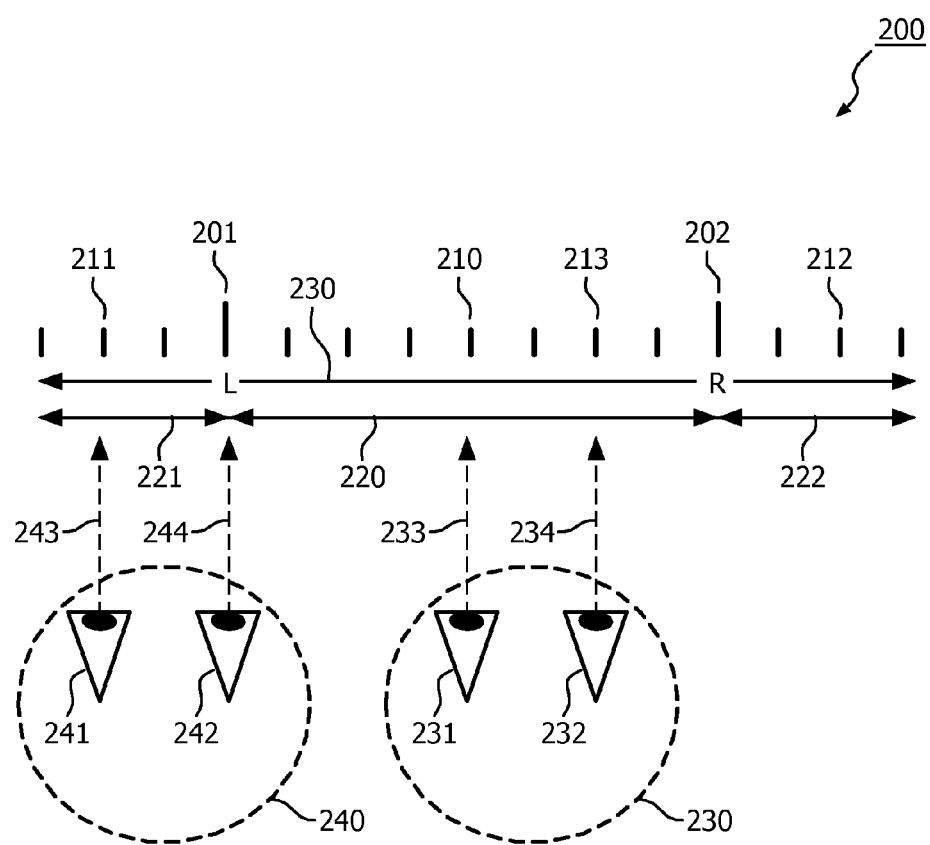
FIG. 2 illustrates multiple views of a multi-view display.

In what follows, the impact, in terms of image quality, of a mixing policy on the generating of an intermediate image is explained using FIG. 2.

FIG. 2 illustrates multiple views of a multi-view display. The multiple views are indicated as vertical stripes, forming a horizontally adjacent series of views. For each view, the multi-view display shows a corresponding intermediate image IB. Several views are indicated by numbers 201, 202, and 210-213. All views lie in a view range 230. The original views of the stereo images are indicated as a left view L 201 and a right view R 202. The view range 230 is divided into three parts: (i) a central view range 220, (ii) a left lateral view range 221, and (iii) a right lateral view range 222. View 210 is a central stereo view lying halfway in between the left view L and the right view R. In contrast, views 211 and 212 lie in the lateral view ranges 221 and 222, respectively.

The view configuration as shown in FIG. 2 represents an example view configuration as may result from the use of a lenticular-based or barrier-based autostereoscopic display. An example of such a lenticular-based multi-view display is disclosed in U.S. Pat. No. 6,064,424.

In what follows in the explanation of FIG. 2, a typical mixing policy is used that (a) defines a mixing using both intermediate images IBL, IBR for views in the central view range 230, (b) defines a mixing using only the left intermediate image IBL for views in the left lateral view range 211, and (c) defines a mixing using only the right intermediate image IBR for views in the right lateral view range 212. A mixing comprises adding a relative contribution of the left intermediate image IBL and a relative contribution of the right intermediate image IBR.

For views in the central view range 230, both of the intermediate images IBL,IBR are mixed into an intermediate image IB, wherein a relative contribution of the left intermediate image IBL to the mixing is large for a view near to view L and is low for a view far from view L, and wherein, consequently, a relative contribution of the right intermediate image IBR to the mixing is large for a view near to view R and low for a view far from view R.

At the left lateral view range 221 including the left view L, the relative contribution of the left intermediate image IBL is 100% and the relative contribution of the right intermediate image IBR is 0%, so that the mixing process simply copies the intermediate left image IBL to its output IB, thus IB=IBL. This implies that intermediate images at the left lateral views are generated only by the warping process WARP 130, and are thus effectively extrapolated from the left original image IL. In the specific case of the left view L, the warping process WARP 130 simply copies the input IL to its output IBL, so that IBL=IL and thus IB=IBL=IL, which implies that the original left image IL is shown at view L.

At the right lateral view range 222 including the right view R, the relative contribution of the right intermediate image IBR is 100% and the relative contribution of the left intermediate image IBL is 0%, so that the mixing process simply copies the intermediate right image IBR to its output IB, thus IB=IBR. This implies that intermediate images at the right lateral views are generated only by the warping process WARP 140, and are thus effectively extrapolated from the right original image IR. In the specific case of the right view R, the warping process WARP s140 simply copies the input IR to its output IBR, so that IBR=IR and thus IB=IBR=IR, which implies that the original right image IR is shown at view R.

FIG. 2 schematically shows a viewer 230 with a left eye 231 seeing an intermediate image at view 210, and with a right eye 232 seeing an intermediate image at view 213. The views 210 and 213 are situated in the central view range 220, thus between the original views L and R, so that each of the viewer's eyes, 231 and 232, sees an intermediate image generated by the mixing of the intermediate images IBL and IBR. The mixing, for views in the central view range 220, has a benefit and a drawback in terms of image quality of the intermediate images. The benefit is that occlusion artifacts are not notably present in the intermediate images, but the drawback is that image details in the intermediate images suffer from blurring and ghosting. The benefit is due to the mixing effectively being an interpolating between the intermediate images, IBL and IBR, and consequently the (interpolated) intermediate images do not comprise notable occlusion artifacts. The drawback is due to inaccuracies in the disparity data DL and DR, and is explained as follows. A single data value in the left disparity data DL comprises a pixel distance between (1) a pixel position of an image detail in the original left image IL, and (2) a corresponding pixel position of the same image detail in the original image IR. The left disparity data DL is used by the warping process WARP 130 to generate the left intermediate image IBL, at intermediate view B, from the original left image IL. The right disparity data DR is used by the warping process WARP 140 to generate the right intermediate image IBR, at view B, from the original right image IR. Inaccuracies in the disparity data DL,DR therefore cause image details to be generated at incorrect pixel locations of the intermediate images IBL,IBR, and consequently the mixing of image details of the intermediate images IBL,IBR typically result a generating of an intermediate image IB comprising the image details that suffer from blurring or ghosting artifacts.

FIG. 2 schematically shows a viewer 240 with a left eye 241 seeing an intermediate image at view 211, and a right eye 242 seeing an intermediate image at view 201. The right eye 242 thus sees the original left image, which by definition has an optimal image quality. In contrast, the left eye 241 sees an intermediate image that was generated at the left lateral intermediate view 211 from the original left image IL, and is effectively extrapolated from the original left image. The intermediate image at view 211 has a benefit and a drawback in terms of image quality. The benefit is that image details do not suffer from blurring or ghosting of image details. The drawback is the appearance of occlusion artifacts, due to the extrapolation from only the left image. The same benefit and drawback hold for a right lateral view, such as the view 212.

In an embodiment of the invention, the mixing policy used in the generating of an intermediate image adapts to the content of the original stereo data. For stereo images comprising much detail, the policy determining process POLDET determines a mixing policy that defines a mixing using only one of the intermediate images IBL,IBR, rather than using both of the intermediate images IBL,IBR. As a first example of the embodiment, a mixing policy defines a mixing that simply copies the left intermediate image IBL to the intermediate image IB, for all intermediate views in the view range 230. As a second example of the embodiment, a mixing policy defines that a mixing that simply copies the right intermediate image IBR to the intermediate image IB, for all intermediate views in the view range 230. As a third example of the embodiment, a mixing policy defines a mixing that copies the intermediate image IB from (a) the left intermediate image IBL for views at the left of the central stereo view 210 and from (b) the right intermediate image IBR for views at the right of the central stereo view 210. In the case that the original stereo image comprises little image detail so that blurring of image detail is not notably visible, a mixing policy is determined that defines a mixing that uses both of the intermediate images IBL, IBR.

Figure 3A:
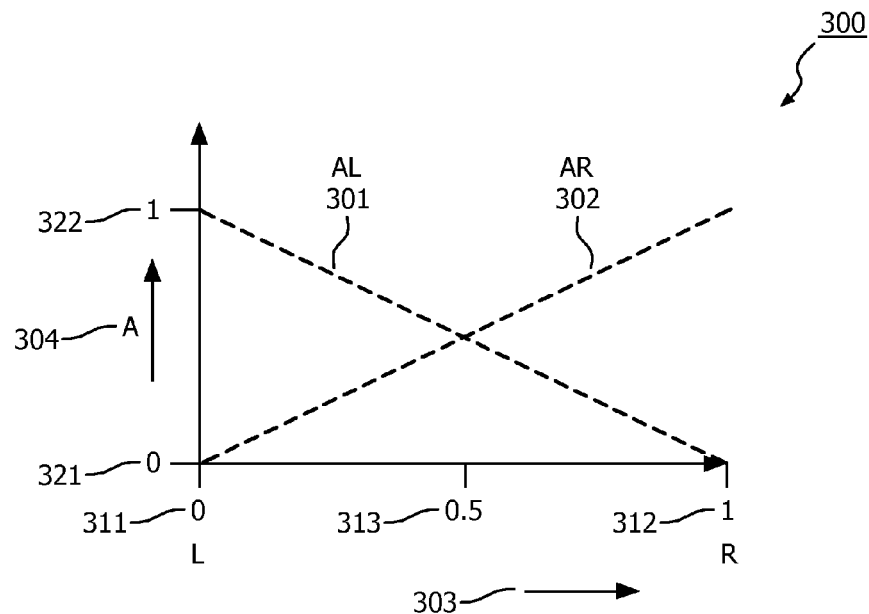
FIG. 3a illustrates a linear mixing policy.
Figure 3B:
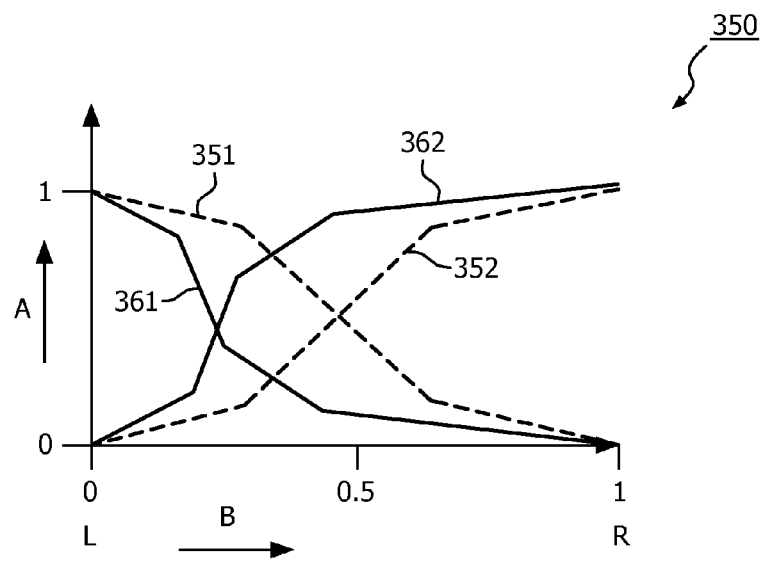
FIG. 3b illustrates two nonlinear mixing policies.

In what follows, the mixing process MIX 180 comprising a blending process BLEND and the factor computing process ACOMP. FIGS. 3a and 3b illustrate mixing policies defining mixing factors for mixing of the two intermediate image data IBL and IBR.

FIG. 3a illustrates a linear mixing policy. The two curves AL 301 and AR 302 combined represent a single mixing policy. Curves AL 301 and AL 302 describe how a mixing factor A 304 depends on an intermediate view B 303. A curve AL 301 describes a mixing factor corresponding to the left intermediate image IBL, and a curve AR 302 describes a mixing factor corresponding to the right intermediate image IBR. The mixing factors of curves AL and AR are complementary and add up to a total of one, i.e. AL+AR=1. The mixing factors AL and AR linearly depend on the intermediate view B. Note that a tick mark 311 at value B=0 corresponds to the original left view L, a tick mark 312 at value B=1 corresponds to the original right view R, and a tick mark 313 at value B=0.5 corresponds to a central stereo view, e.g. the view 210 in FIG. 2. An example of the mixing in blending process BLEND is a mixing according to alpha blending, which is performed as follows:

$$IB=AL*IBL+AR*IBR, \text{ wherein } AL+AR=1.$$

In FIGS. 3a and 3b, an intermediate image IB at the original view L equals the original left image IL at B=0, thus IB=IBL=IL. An intermediate image IB at the original view R equals the original right image IR at B=1, thus IB=IBR=IR. An intermediate image IB at the central view, thus at B=0.5, equals the average of the intermediate image IBR and IBL, thus IB=0.5*IBL+0.5*IBR.

Note that the mixing factor AL represents a relative contribution of the left intermediate image IBL in the mixing, and that the mixing factor AR represents a relative contribution of the right intermediate image IBR in the mixing. The mixing factor in this context is commonly also referred to as 'blend factor'.

Note that the mixing policies for the lateral view ranges, thus for B<0 and for B>1, are not indicated in FIG. 3a. It is therefore hereby implied that AL=1 for views in the left lateral view range, thus for B<0, and that AL=0 for views in the right lateral view range, thus for B>1. Consequently, AR=0 for views in the left lateral view range, and AR=1 for views in the right lateral view range.

FIG. 3b illustrates two nonlinear mixing policies. Curves 351 and 352 are similar to the respective curves AL 301 and AL 302 of FIG. 3a, with the difference that curves 351 and 352 depend in a nonlinear manner on the intermediate view B. The curves 351 and 352 present an alternative to the linear curves of FIG. 3a. The effect of the nonlinear mixing policy using curves 351, 352 is that the relative contribution in the mixing by the left intermediate image IBL is larger for views at the left of the central stereo view, when using the nonlinear curve 351 as compared to using the linear curve 301. Likewise, the relative contribution in the mixing by the right intermediate image IBR is larger for views at the right of the central view, when using the nonlinear curve 352 as compared to using the linear curve 302.

FIG. 3b also shows an asymmetric nonlinear mixing policy. The nonlinear asymmetric curves 361,362 are similar to the respective curves 351,352 in the sense of a non-linearity, but are different in the sense of an asymmetry. As curve 362 is on average larger than curve 361, the curves 361,362 show that the mixing factor is on average higher for the right intermediate image IBR. Consequently, at the central stereo view, i.e. at B=0.5, the relative contribution of the right intermediate image IBR to the intermediate image IB (curve 362) is larger than the relative contribution of the left intermediate image IBL to the intermediate image IBL (curve 361). In other words, the relative contribution of the right intermediate image IBR in the mixing is dominant over the relative contribution of the left intermediate image IBL in the mixing.

The left-right asymmetry in the curves of FIG. 3b is controlled by an asymmetry parameter ParA, such that the asymmetry in the curves may be increased or decreased by means of changing the asymmetry parameter ParA.

By increasing the asymmetry of curves 361 and 362 further, the crossing of the curves 361 and 362 will shift even more towards the left, thus toward B=0, and therefore curve 362 will tend, on average, even more towards A=1. Consequently, for an increasing number of views, the intermediate image IB will be generated using a large relative contribution of the right intermediate image IBR in the mixing, so that the intermediate image IB increasingly resembles the right intermediate image IBR and decreasingly resembles the left intermediate image IBL. By increasing the asymmetry parameter ParA to its largest positive value ParA=+1, the said relative contribution of the right intermediate image IBR becomes 1 for all intermediate views B. In other words, each intermediate image IB becomes a copy of the right intermediate image IBR, so that the intermediate image IB is generated using only the right image IR, the right disparity data DR and the intermediate view B. The latter case is also commonly known as 'rendering from image plus depth'.

Likewise, the asymmetry parameter ParA can be used to shift the asymmetry in the other direction, moving the crossing towards the right, i.e. thus toward B=1.0. Analogous to the previous example, increasingly shifting the said crossing to the right, the relative contribution of the left intermediate image IBL to the intermediate image IB increases further. By increasing the asymmetry parameter ParA to its largest negative value ParA=-1 said relative contribution of the left intermediate image IBL becomes 1 for all intermediate views B between B=0 and B=1. In other words, the intermediate image IB becomes a copy of the left intermediate image IBL, so that the intermediate image IB is generated using only the left image IL, the left disparity data DL and the intermediate view B.

For an asymmetry parameter ParA assuming a value nearer to zero, the curves in FIG. 3b become less asymmetric, which corresponds to a mixing policy wherein said relative contributions of intermediate images IBL, IBR become more equal. For one specific value of the asymmetry parameter, being ParA=0, the curves describe a symmetric nonlinear mixing policy, such as illustrated by the curves 351,352.

The asymmetry parameter is thus effectively a 'soft switch', that can be used to gradually switch the mixing policy and thereby gradually switch between (a) generating an intermediate image from both the left data and the right data, and (b) generating intermediate image from only one of the left data and the right data. The said gradual switching of a mixing policy will be elaborated further below in this document.

Optionally, the intermediate image is generated from stereo data comprised by a stereo view still image. Optionally, the intermediate image is generated from stereo data comprised by a stereo view frame of a stereo view video sequence.

Optionally, two intermediate images are generated to form the new left image and the new right image of a new stereo image, the new left image corresponding to a new left view, and the new right image corresponding to a new right view, wherein the new left view and the new right view differ from the original left view and right view, respectively. Such generation of two intermediate images is also commonly referred to as stereo-to-stereo conversion, and may be applied for reducing or amplifying the depth range of the stereo data. The new stereo image may be viewed on a dedicated stereo view display by a viewer using stereo view glasses.

Optionally, a series of intermediate images, corresponding to a horizontal series of views, is generated for viewing on a multiview autostereoscopic display which is capable of simultaneously displaying the images in the series of intermediate images. The series typically comprises more than two views. For example, a multiview autostereoscopic display comprises 9 views.

Optionally, a series of intermediate images is generated for a respective series of views from each frame of a stereo view video sequence. The series of views comprises consecutive intermediate views. The series of intermediate images is viewed, for example, on a multiview autostereoscopic display.

Optionally, a stereo view video sequence comprises various scenes, and a single mixing policy is used within a scene. A scene comprises multiple consecutive stereo view video frames, and, in this case, the same mixing policy is used within the scene for generating an intermediate image from each stereo view video frame. The mixing policy used within the scene may differ from a mixing policy used within a subsequent scene. By using a scene change detector, the beginning of a next scene is detected and a next mixing policy is determined at the first frame of a new scene. Within the next scene, the next mixing policy is used. Rather than using a scene change detector, a scene change may be indicated by meta-data comprising scene change indicators, wherein the meta-data is included by the stereo view video sequence.

Figure 4:
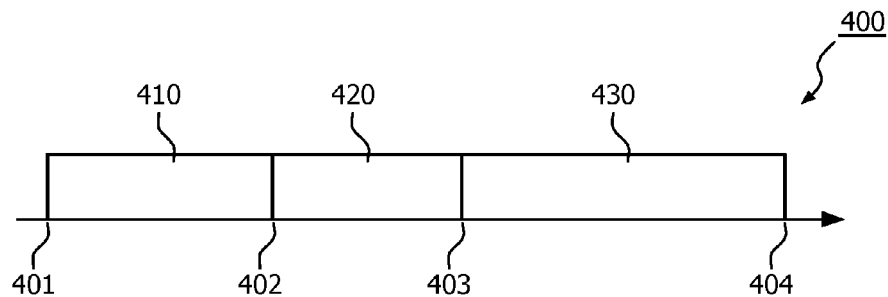
FIG. 4 illustrates three consecutive scenes of a stereo view video sequence comprising stereo video frames.

An overview of state-of-art scene detection, or shot transition detection methods, as well as an analysis of their workings, is available in: Alan F. Smeaton, "Video shot boundary detection: Seven years of TRECVid activity", Computer Vision and Image Understanding 114 (2010) 411-418, 2010, hereby incorporated by reference. FIG. 4 illustrates three consecutive scenes 410, 420 and 430 of a stereo view video sequence 400 comprising stereo video frames. The stereo video sequence consists of stereo video frames comprising a left image and a right image. The horizontal axis in FIG. 4 represents a time axis. The sections 410, 420 and 430 each present a section of the stereo view video sequence, starting at (time) instance 401, 402 and 403 respectively, whereas section 430 ends at instance 404. Sections 410, 420 and 430 represent scenes, and instances 402 and 403 represent scene changes. The term 'scene' as used in the present context refers to the same matter as is commonly referred to by the term 'shot'.

The embodiment described hereinabove, wherein a single mixing policy is used within a scene, is further explained in the following example. Section 410 contains frames comprising much detail, and therefore a mixing policy is determined that defines a mixing using only the left intermediate image IBL. Section 420 contains little detail and therefore a mixing policy is determined that defines a mixing using both the left intermediate image IBL and the right intermediate image IBR, such as the mixing policy described by the curves FIG. 3a. Like section 410, section 430 contains frames comprising much detail, and therefore a mixing policy is determined that defines a mixing using only the right intermediate image IBR. Scene changes are detected at instances 402 and 403 and consequently a new mixing policy is determined and used in the generating of the intermediate image IB.

As an additional example, adding to the previous example, a series of intermediate images, corresponding to a respective series of intermediate views, is generated from each stereo video frame, and the series of intermediate image is viewed on a multi-view autostereoscopic display.

Optionally, the determining of a mixing policy gradually changes within a scene of a stereo view video sequence. This is achieved with a mixing that uses the asymmetry parameter, as described above in the explanation of FIG. 3b. Consider the following example. For generating from an early frame of a scene, a first mixing policy is determined (using ParA=-1), defining a mixing that uses only the left intermediate image IBL, thus effectively generating an intermediate image IB from only the (original) left data. For generating from a late frame of the scene, a second mixing policy is determined (using ParA=0), defining a mixing that uses both of the two intermediate images, IBL,IBR, thus effectively generating an intermediate image IB from both the left data and the right data. Yet, to prevent sharp transitions in the intermediate image IB, the mixing policy is changed gradually from the first mixing policy to the second mixing policy for frames in between the early frame and late frame. By gradually changing the asymmetry parameter between two frames, a gradual changes is established in the mixing policy, and consequently the intermediate image changes gradually also. For frames in between the early frame and the later frame, the asymmetry parameter thus changes gradually from ParA=−1 for the early frame to ParA=0 for the late frame.

Figure 5:
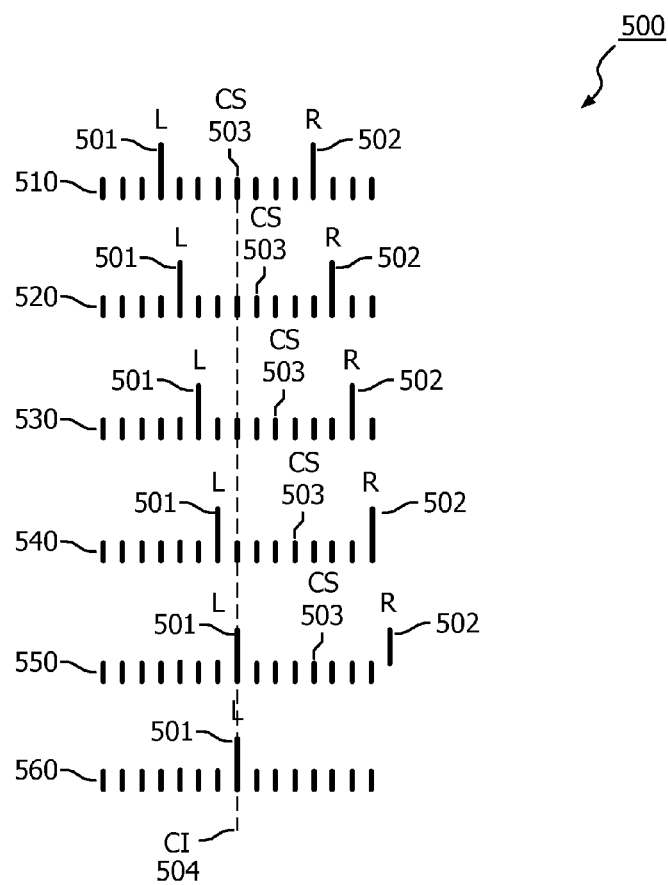
FIG. 5 illustrates, in each of six subfigures, a multi-view display comprising a series of intermediate views centered around a central intermediate view.

FIG. 5 illustrates, in each of six subfigures, a multiview display comprising a series of intermediate views centered at a central intermediate view CI 504. Each of the subfigures 510-550 illustrates a multiview display comprising a series of display views. At each display view, the display shows an intermediate image corresponding to an intermediate view, and therefore the series of display views effectively shows a series of intermediate views. The relative position of an intermediate view within the series of intermediate views remains the same in all subfigures, thus the intermediate views maintain their relative order in the series and their distance to their two neighboring intermediate views. The original stereo views L 501 and R 502 indicate where the left view and the right view reside within the series of intermediate views. The central stereo view CS 503 indicates the intermediate view that lies in the middle of view L and view R. The central intermediate view CI (see also dashed vertical line) resides by definition at the center of the series of intermediate views, but the central intermediate view CI can correspond to any intermediate view between or near the original views L and R. It is inferred from views L, R and C to which intermediate view the central intermediate view CI corresponds. Each of the subfigures 510-550 corresponds to a different central intermediate view CI (except for subfigures 550 and 560, which correspond to the same central intermediate view CI).

For example in subfigure 510, the central intermediate view CI corresponds to the central stereo view CS. In contrast, in subfigure 550 the center series view CI corresponds to the original left view L. From each subfigure to the next subfigure, e.g. from 510 to 520, the central intermediate view shifts by one view. Therefore, the sequence of subfigures 510-550 shows a gradual shift of the central intermediate view CI, i.e. from the central stereo view in subfigure 510 to the original left view in subfigure 550, shifting by one view between subsequent subfigures. Between subfigure 550 and subfigure 560 the central intermediate view CI is however not shifted, which will be used in an example below.

Optionally, the method of FIG. 1 is used for generating a series of intermediate images from stereo data, and the central intermediate view CI is determined such that the intermediate images have optimal image quality for a given content of the stereo data. Consider the following example, wherein the stereo data is comprised by a stereo video sequence, and wherein the mixing policy defines the same mixing for all frames. The mixing policy determines a mixing that uses both intermediate images, IBL and IBR, such as the mixing policy described by FIG. 3a. In the context of this example, the subfigures 510-560 correspond to subsequent frames of a stereo view video sequence. Subfigure 510 corresponds to a situation wherein the multiview display shows a series of intermediate images generated from a stereo video frame, referred to as frame 1 in this example. Likewise, the subfigures 520-560 correspond to respective frames 2-6. The policy detection process uses a detail detector to detect a presence of image detail and selects a central intermediate view CI based on that detected presence. For frame 1, the system, using a detail detector, concludes that little detail is present so that detail artifacts are not visible, and therefore selects the central stereo view CS as the central intermediate view CI. Consequently, the method generates intermediate images for a series of intermediate views wherein the central view of the series corresponds to the central stereo view CS. However, for frame 2, the system concludes that too much detail is present, and therefore concludes that optimal image quality is generated by using the left view L as the central intermediate view CI, because, for example, detail artifacts are less visible for views near the original left view L than for views near the central stereo view CS. In order to prevent an instant transition in the intermediate images (e.g. such that the 3D image makes a sudden 'jump' which results in an unpleasant viewing experience) the central intermediate view CI is not shifted in a single step to the left view L for generating the series of intermediate images from the second frame. Instead, a gradual shifting of the central intermediate view CI toward the original left view L is performed during frames 2-5, completing the gradual shifting at frame 5.

Optionally, the system performs an instant shifting of the central intermediate view CI between one frame and its next frame (as opposed to performing a gradual shifting), for example when a scene change is detected between the one frame and its next frame. As the content of the stereo video frame, as a whole, changes between the one frame and its next frame at a scene change, an instant change in central intermediate view CI is not noticed by a viewer.

Optionally, the policy determining process determines a new mixing policy after completing a shifting of the central intermediate view CI. For example, consider the gradual shifting during frame 1-5 as described hereinabove. For frame 6 (see subfigure 560) the mixing policy is changed to a new mixing policy, which defines, for example, a mixing using only the left intermediate image IBL (or in other words, effectively using 'image plus depth').

Optionally, in an analogous manner to the previous paragraph, the policy determining process determines a new mixing policy before initiating a shifting of the central intermediate view CI. The new mixing policy does not change during the gradual shifting.

Optionally, the policy determining process gradually determines changes the mixing policy simultaneously with the gradual shifting. Consider the gradual shifting during frame 1-5, but wherein the mixing policy is a nonlinear asymmetric mixing policy controlled by the asymmetry parameter ParA (see also FIG. 3b). At frame 1, a mixing is determined using both intermediate images IBL and IBR, such as described by curves 351-352 in FIG. 3b. At frame 5, the mixing uses only the left intermediate image IBL. The mixing at frame 1, 2, 3, 4, 5 is defined by ParA=0.0, −0.25, −0.5, −0.75, −1.0, respectively. Optionally, the central intermediate view CI is shifted at frames being several frames apart. For example, the central intermediate view CI is shifted by one view once every 10 frames, making the gradual shift slower compared to shifting by one view at every frame. Optionally, the central intermediate view CI is shifted by a fraction of a view, or by more than one view.

Figure 6:
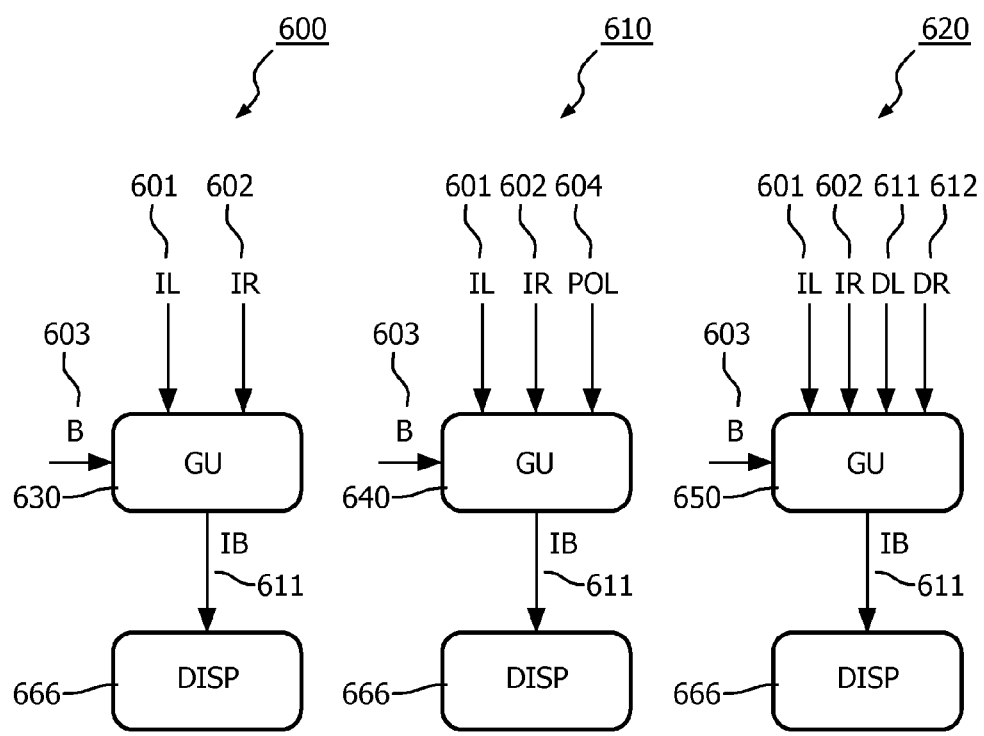
FIG. 6 illustrates a system, in three configurations, for generating an intermediate image from stereo data and a display for showing the intermediate image.

FIG. 6 illustrates a system, in three configurations, for generating an intermediate image from stereo data and for showing the intermediate image on a display. The system is arranged for showing the generated intermediate image on a display. Generating units GU 630,640,650 are all arranged to generate an intermediate image IB 611, and are all arranged to receive the stereo images IL,IR and the intermediate view B 603. Display unit DISP 666 is arranged to show the intermediate image IB received from one of the generating units GU 630,640,650

FIG. 6 illustrates the system 600 for generating the intermediate image IB 611 from a stereo image, and for showing the intermediate image IB 611 on the display DISP. Generating unit GU 630 is configured to generate the intermediate image IB 611 from the stereo images IL,IR, and to receive the original left image IL, the right image IR and the intermediate view B 603 at its input. Process GU 630 comprises the following functions:

(a) a left disparity computation function to receive the original left- and right images IL,IR, to compute the left disparity data DL from the left- and right images IL,IR, and to pass the computed the left disparity data DL to a left warping function; and (b) a right disparity computation function to receive the original left- and right images IL,IR, to compute the right disparity data DR from the left- and right images IL,IR, and to pass the computed right disparity data DR to a right warping function; and (c) the left warping function to receive the intermediate view B 603, the left image IL, and the left disparity data DL, and to generate the left intermediate image IBL, and to pass the left intermediate image IBL to a mixing function; and (d) the right warping function to receive the intermediate view B 603, the right image IR, and the right disparity data DR, to generate the right intermediate image IBR, and to pass the right intermediate image IBR to the mixing function; and (e) a policy determining function to receive the original left image IL and the original right image IR, and to determine the mixing policy based on a predicted image quality of an intermediate image generated by the system using that mixing policy, and to pass the mixing policy to the mixing function; and (f) the mixing function to receive the left intermediate image IBL from the left warping function, to receive the right intermediate image IBR from the right warping function, to receive the intermediate view B 603, and to receive a mixing policy from a policy determining function, and to generate the intermediate image IB 611 by a mixing of the intermediate images IBL,IBR using the intermediate view B 603 and the mixing policy.

Optionally, the generating unit is general purpose processor comprising software to perform the functions of the system. Optionally, the generating unit is an ASIC comprising dedicated application logic to perform the functions of the system.

Optionally, the system 600 comprises a single warping function, instead of the left warping function and the right warping function. The left warping function and the right warping function are identical and are configured to perform the same computations, and differ only in the inputs they process. The single warping function is identical to the left warping function or to the right warping function. The system 600 comprises the single warping function to compute the intermediate images IBL,IBR sequentially. For example, the single warping function is performed as follows. The single warping function first receives left data IL,DL, the intermediate view B, and generates the left intermediate image IBL, and passes the left intermediate image IBL to the mixing process. The single warping function then receives the right data IR,DR, the intermediate view B, and generates the right intermediate image IBR, and passes the right intermediate image IBR to the mixing process. The system 600 comprises the mixing function to perform the mixing once it has received all four inputs IBL,IBR,B,POL. Optionally, the single warping function first generates the right intermediate image IBR and then the left intermediate image IBL in a time-sequential manner.

FIG. 6 illustrates a system 610 configured for generating an intermediate image from a stereo image, and mixing policy, and to show the intermediate image on a display. The generating unit GU 640 is the same as unit GU 630, except for the following difference. Unit GU 640 does not comprise a policy determining function, and the mixing function is configured to receive the mixing policy POL 604 from the input of GU 640.

FIG. 6 illustrates a system 620 configured for generating an intermediate image from stereo image, and from disparity data, and to show the intermediate image on a display. The generating unit GU 650 is the same as unit GU 630, except for the following difference. Generating unit GU 650 does not comprise a disparity processing function. The left warping function is configured to receive the left disparity DL 611 directly from the input. Likewise, the right warping function is configured to receive the right disparity DR 612 directly from the input.

Optionally, the display unit DISP is a multiview display that shows the intermediate image IB in one of its display views.

Optionally, the display unit DISP is a stereo view display, and a head-tracking device is arranged to provide a left intermediate view BL and a right intermediate view BR to the generating unit GU. The generating unit GU is arranged to generate a new left image and a new right image using the respective intermediate views BL,BR and to provide the generated stereo image to the display unit DISP. The display unit DISP is arranged to show the stereo image, which is viewed by a viewer using stereo glasses arranged to enable the viewer to perceive a 3D image on the display unit DISP. The resulting system, comprising the generating unit GU and the display unit DISP, is arranged for a viewer to visually perceive a 3D image and to look behind foreground objects in the 3D image by making active head movement.

As described hereinabove, the mixing policy may be pre-computed and provided to a rendering system or rendering device as metadata complementing the original stereo data (105). The invention thus advantageously also enables a method of generating output stereo data for use in generating an intermediate image 161 from stereo data 105, the stereo data 105 comprising a left data 103 and a right data 104, the left data 103 comprising a left image 101 and a left disparity data 111, the left data 103 corresponding to a left view, the right data 104 comprising a right image 102 and a right disparity data 112 the right data 104 corresponding to a right view, and the intermediate image 161 corresponding to an intermediate view 155, the method comprising: determining 170 a mixing policy 156 based on a predicted image quality of the intermediate image 161; generating output stereo data by combining the stereo data 105 with the determined mixing policy.

The output stereo data as described hereinabove can be used to enable an improved generation of the intermediate image 161, compared to the prior art, in that it enables a system 600 arranged for generating an intermediate image 161 when the determined mixing policy 156 so requires, to generate a left intermediate image 131 from the left data 103 for the intermediate view 155; and when the determined mixing policy 156 so requires, to generate a right intermediate image 141 from the right data 104 for the intermediate view 155; and when the determined mixing policy 156 so requires, to generate the intermediate image 161 by mixing 180 the left intermediate image 131 and the right intermediate image 141, according to the mixing policy 156.

The present invention also enables a system for generating a output stereo data for use in generating an intermediate image 161 from stereo data 105, the stereo data 105 comprising a left data 103 and a right data 104, the left data 103 comprising a left image 101 and a left disparity data 111, the left data 103 corresponding to a left view, the right data 104 comprising a right image 102 and a right disparity data 112 the right data 104 corresponding to a right view, and the intermediate image 161 corresponding to an intermediate view 155, the system comprising a generating unit arranged for: determining 170 a mixing policy 156 based on a predicted image quality of the intermediate image 161 and generating output stereo data by combining the stereo data 105 with the determined mixing policy.

The output stereo data as described hereinabove can be used to enables an improved generation of the intermediate image 161, compared to the prior art, in that it enables a system 600 arranged for generating an intermediate image 161 when the determined mixing policy 156 so requires, to generate a left intermediate image 131 from the left data 103 for the intermediate view 155; and when the determined mixing policy 156 so requires, to generate a right intermediate image 141 from the right data 104 for the intermediate view 155; and when the determined mixing policy 156 so requires, to generate the intermediate image 161 by mixing 180 the left intermediate image 131 and the right intermediate image 141, according to the mixing policy 156.

The mixing policy information, or mixing policy metadata that is included in the output stereo data may comprise information ranging from a mixing factor or blend factor, a asymmetry parameter, a central stereo view description, a view position allocation for use in driving a multi-view display as described hereinabove. This information may be provided on a per frame basis, or preferably in the form of a lookup-table per scene, linking the parameters to respective frames within the scene, or in the form of a functional description, using e.g. a piece-wise linear, or spline based representation, the representation allowing the playback device to derive the appropriate parameters for the frames from the functional description.

Although the output stereo data may comprise a singular stereo image pair, the use of metadata is particularly advantageous for stereo video sequences, as it enables improved rendering of such video sequences on multi-view displays. The output stereo data generated in accordance with the above method may further include further metadata and/or information for use in rendering on a multi-view display device.

The output stereo data may be output as a signal for broadcast, or as a signal for transfer over a digital network, such as a local network, a companies, intra-net, or the internet. The resulting signal is a signal for use in generating an intermediate image 161 from stereo data 105, the signal comprising the stereo data 105, the stereo data 105 comprising a left data 103 and a right data 104, the left data 103 comprising a left image 101 and a left disparity data 111, the left data 103 corresponding to a left view, the right data 104 comprising a right image 102 and a right disparity data 112 the right data 104 corresponding to a right view, and the intermediate image 161 corresponding to an intermediate view 155, and mixing policy data determining a mixing policy 156 based on a predicted image quality of the intermediate image (161).

The signal as described hereinabove can be used to enable an improved generation of the intermediate image 161, compared to the prior art, in that it enables a system 600 arranged for generating an intermediate image 161 when the determined mixing policy 156 so requires, to generate a left intermediate image 131 from the left data 103 for the intermediate view 155; and when the determined mixing policy 156 so requires, to generate a right intermediate image 141 from the right data 104 for the intermediate view 155; and when the determined mixing policy 156 so requires, to generate the intermediate image 161 by mixing 180 the left intermediate image 131 and the right intermediate image 141, according to the mixing policy 156.

Likewise the signal may be recorded on a digital data carrier such as an optical data carrier in the form of a Blu-ray disc, or an equivalent optical data carrier, or on an electronic non-volatile medium such as a flash or solid-state storage device. More information on the Blu-ray Disc Format can be found here: http://blu-raydisc.com/assets/Downloadablefile/BD-ROM-AV-WhitePaper_110712.pdf hereby incorporated by reference. Preferably the meta-data associated with the view rendering is included according to the standard as decoding information, in at least one of a user data message; a signaling elementary stream information [SEI] message; an entry point table; or an XML based description.

The advantage of distributing the output stereo data over the original input stereo data 105 is that at the author side the content typically is available in full and as a result more expensive and/or time-consuming algorithms (or user assisted algorithms) may be used to determine a suitable mixing policy.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method, comprising:
for each mixing policy of a plurality of mixing policies,
predicting an image quality of an intermediate image produced by mixing a left intermediate image and a right intermediate image according to the mixing policy,
wherein the left intermediate image is generated from left data of input stereo data, the left data comprising left image data and left disparity data corresponding to a left view, and the right image is generated from right data of the input stereo data, the right data comprising right image data and right disparity data corresponding to a right view, and the intermediate image corresponding to an intermediate view at a particular position between the left view and the right view,
wherein the predicting is based on an image characteristic of the stereo data, wherein each mixing policy defines relative contributions of the left intermediate image and the right intermediate image in the mixing,
wherein the image characteristic is one or more of an amount of image detail of the stereo data and one or more disparity transitions in the stereo data,
wherein the predicted image quality includes at least one of artifacts of the intermediate image, blur of the intermediate image, detail sharpness of the intermediate image, and ghosting of the intermediate image;
selecting a selected mixing policy among the plurality of mixing policies based on the predicted image quality of the corresponding intermediate image produced by employing the selected mixing policy;
generating the left intermediate image when generation of the left intermediate image is required by the selected mixing policy;
generating the right intermediate image when generation of the right intermediate image is required by the selected mixing policy; and
generating the intermediate image by mixing the left intermediate image and the right intermediate image, using relative contributions of the left intermediate image and the right intermediate image according to the selected mixing policy.

2. The method of claim 1, wherein the selected mixing policy is performed by retrieving the mixing policy from meta-data coupled to the stereo data.

3. The method of claim 1, wherein predicting the image quality of the intermediate image based on the image characteristic of the stereo data comprises predicting an amount of image detail of the intermediate image based on the amount of image detail of the stereo data.

4. The method of claim 1, further comprising generating subsequent intermediate images from respective subsequent frames of the stereo data, wherein the stereo data is a video sequence.

5. The method of claim 4, wherein determining the mixing policy comprises:
determining a first mixing policy for generating a first intermediate image from a first frame at a first instance; and
determining a second mixing policy for generating a second intermediate image from a second frame at a second instance.

6. The method of claim 5, wherein determining the mixing policy comprises determining a third mixing policy for generating a third intermediate image from a third frame at a third instance,
wherein the third instance occurs after the first instance and before the second instance,
wherein a third relative contribution is defined by the third mixing policy lies in between a first relative contribution defined by the first mixing policy and a second relative contribution defined by the second mixing policy,
wherein the first, second and third relative contributions all correspond to the left intermediate image.

7. The method of claim 1, further comprising generating a first series of intermediate images from the stereo data, the first series of intermediate images corresponding to a first series of adjacent intermediate views.

8. The method of claim 7, wherein generating the first series of intermediate images comprises:
centering the first series of intermediate views at a first intermediate view, the first intermediate view being a view between the left and right view, wherein a central intermediate view of the first series of intermediate views corresponds to the first intermediate view, and
selecting the first intermediate view based on a predicted image quality of the first series of intermediate images.

9. The method of claim 7,
wherein the stereo data is a video sequence,
wherein the first series of intermediate images is generated from a first frame of the video sequence,
wherein the first frame corresponds to a first instance in time,
wherein generating the intermediate image further comprises generating a second series of intermediate images from a second frame of the video sequence, the second frame corresponding to a second instance in time, and the second series of intermediate images corresponds to a second series of adjacent intermediate views centered at the second view.

10. The method of claim 9, wherein generating the intermediate image comprises:
generating a third series of intermediate images from a third frame of the video sequence,
wherein the third frame corresponds to a third instance in time,
wherein the third series of intermediate images corresponds to a third series of adjacent intermediate views centered at the third view,
wherein the third instance in time occurs after the first instance in time and before the second instance in time,
wherein the third view lies in between the first view and the second view.

11. The method of claim 1,
wherein the plurality of mixing policies comprises at least one mixing policy among a first mixing policy and a second mixing policy,
wherein the first mixing policy defines a left relative contribution of the left intermediate image in the mixing, and defines a right relative contribution of the right intermediate image in the mixing,
wherein one of the left relative contribution and the right relative contribution dominating an other one of the left relative contribution and the right relative contribution,
wherein the second mixing policy defines the relative contribution of the left intermediate image to be zero, corresponding copying the right intermediate image to the intermediate image.

12. The method of claim 1, wherein the left disparity data and the right disparity data are both computed from the left image and the right image.

13. A system comprising:
a generating circuit comprising
a predicting function configured to predict, for each mixing policy of a plurality of mixing policies, an image quality of an intermediate image produced by mixing a left intermediate image and a right intermediate image according to the mixing policy,
wherein the left intermediate image is generated from left data of input stereo data, the left data comprising left image data and left disparity data corresponding to a left view, and the right image is generated from right data of the input stereo data, the right data comprising right image data and right disparity data corresponding to a right view, and the intermediate image corresponding to an intermediate view at a particular position between the left view and the right view,
wherein the predicting is based on an image characteristic of the stereo data, each mixing policy defining relative contributions of the left intermediate image and the right intermediate image in the mixing, wherein the image characteristic is one or more of an amount of detail of the stereo data and one or more disparity transitions in the stereo data, wherein the predicted image quality includes at least one of artifacts of the intermediate image, blur of the intermediate image, detail sharpness of the intermediate image, and ghosting of the intermediate image;

a mixing policy selection function configured to select a selected mixing policy among the plurality of mixing policies based on the predicted image quality of the intermediate image produced by employing the selected mixing policy;

a left warping function configured to generate the left intermediate image when the selected mixing policy so requires;

a right warping function configured to generate the right intermediate image when the selected mixing policy so requires; and a mixing function for configured to generate the intermediate image by mixing the left intermediate image and the right intermediate image, using the relative contributions of the left intermediate image and the right intermediate image according to the selected mixing policy.

14. The system of claim 13, wherein the mixing policy selection function is configured to retrieve the mixing policy from meta-data coupled to the stereo data.

15. The system of claim 13, wherein the intermediate image is used for driving the intermediate view of a multi-view display.

16. The method of claim 1, wherein the predicted image quality of the intermediate image includes the detail sharpness of the intermediate image.

17. The system of claim 13, wherein the predicted image quality of the intermediate image includes image blur and ghosting of the intermediate image.

18. The system of claim 13, wherein the predicting function is configured to predict an amount of image detail of the intermediate image based on the amount of image detail of the stereo data.

19. The system of claim 13, wherein the stereo data is a video sequence, the method comprising generating subsequent intermediate images from respective subsequent frames of the stereo data.

* * * * *